United States Patent
Cremer et al.

(10) Patent No.: US 11,947,202 B2
(45) Date of Patent: *Apr. 2, 2024

(54) PHASE MODULATOR DEVICE AND METHOD

(71) Applicant: STMicroelectronics (Crolles 2) SAS, Crolles (FR)

(72) Inventors: Sébastien Cremer, Sassenage (FR); Frédéric Boeuf, St Nazaire les Eymes (FR); Stephane Monfray, Eybens (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,121

(22) Filed: Apr. 3, 2023

(65) Prior Publication Data
US 2023/0236446 A1 Jul. 27, 2023

Related U.S. Application Data

(63) Continuation of application No. 16/988,480, filed on Aug. 7, 2020, now Pat. No. 11,644,697.

(30) Foreign Application Priority Data

Aug. 19, 2019 (FR) ...................................... 1909284

(51) Int. Cl.
*G02F 1/01* (2006.01)
*G02B 6/12* (2006.01)
*G02F 1/035* (2006.01)

(52) U.S. Cl.
CPC ......... *G02F 1/035* (2013.01); *G02B 6/12004* (2013.01); *G02F 1/0147* (2013.01); *G02F 2201/063* (2013.01)

(58) Field of Classification Search
CPC ..... G02B 6/12004; G02F 1/025; G02F 1/035; G02F 1/0147; G02F 2201/063
(Continued)

(56) References Cited

U.S. PATENT DOCUMENTS 6,240,226 B1 * 5/2001 Presby .................. G02F 1/3136
385/145
6,411,746 B1 6/2002 Chamberlain et al.
(Continued)

OTHER PUBLICATIONS

Tyler, Nicola et al., "SiN integrated photonics for near-infrared LIDAR", 2018 IEEE Cpmt Symposium Japan (ICSJ), XP033493237, Nov. 19, 2018, pp. 66-66.
(Continued)

*Primary Examiner* — Robert Tavlykaev
(74) *Attorney, Agent, or Firm* — Slater Matsil, LLP

(57) ABSTRACT

The present disclosure relates to a method including the following steps: a) forming a waveguide from a first material, the waveguide being configured to guide an optical signal; b) forming a layer made of a second material that is electrically conductive and transparent to a wavelength of the optical signal, steps a) and b) being implemented such that the layer made of the second material is in contact with at least one of the faces of the waveguide, or is separated from the at least one of the faces by a distance of less than half, preferably less than a quarter, of the wavelength of the optical signal. The application further relates to a phase modulator, in particular obtained by such a method.

20 Claims, 7 Drawing Sheets

(58) Field of Classification Search
USPC .......................................................... 385/1–3
See application file for complete search history.

(56) References Cited

U.S. PATENT DOCUMENTS

| | | |
|---|---|---|
| 6,954,561 B1 * | 10/2005 | Khan .................... G02F 1/0147 |
| | | 385/129 |
| 9,588,360 B2 | 3/2017 | Feng et al. |
| 10,908,438 B1 | 2/2021 | Wood et al. |
| 2005/0232543 A1 | 10/2005 | Tsai et al. |
| 2008/0212914 A1 | 9/2008 | Marks et al. |
| 2010/0247022 A1 | 9/2010 | Li et al. |
| 2011/0274390 A1 | 11/2011 | Zhang et al. |
| 2012/0243825 A1 | 9/2012 | Takizawa et al. |
| 2014/0307995 A1 * | 10/2014 | Ho .......................... G02F 1/065 |
| | | 385/2 |
| 2015/0125111 A1 | 5/2015 | Orcutt et al. |
| 2015/0346520 A1 | 12/2015 | Lee et al. |
| 2017/0131576 A1 | 5/2017 | Gill et al. |

OTHER PUBLICATIONS

Peng, Kaidong, et al., "Non-Volatile, Reconfigurable, Zero-Static Power Optical Routing for Transistor-Laser-Based Electronic-Photonic Processing" Techcon, year 2018, 4 pages.

\* cited by examiner

PHASE MODULATOR DEVICE AND METHOD

CROSS-REFERENCE TO RELATED APPLICATIONS

This application is a continuation of U.S. application Ser. No. 16/988,480, filed on Aug. 7, 2020, which application claims the benefit of French Application No. 1909284, filed on Aug. 19, 2019, which applications are hereby incorporated by their reference herein in their entirety.

TECHNICAL FIELD

The present disclosure relates generally to photonic integrated circuits and methods, and more particularly to phase modulator devices and methods.

BACKGROUND

Photonic integrated circuits are known to include a phase modulator provided with a waveguide and a heating element. The heating element, typically a metallic layer portion, is configured to modify, in a controlled manner, the temperature of the material of the waveguide, and therefore the effective optical index of a signal propagating in the waveguide. When a control current circulates in the portion of the metallic layer making up the heating element, this results in a corresponding increase in its temperature by the Joule effect, and therefore of the waveguide positioned near the heating element. FIG. 2 of the article by Tyler et al. titled "SiN integrated photonics for near-infrared LIDAR" and published in IEEE CPMT Symposium Japan (ICSJ) 2018, shows an example of such a modulator.

SUMMARY

There is a need to address all or some of the drawbacks of known phase modulators including a waveguide and a heating element configured to modify the temperature of the waveguide.

One embodiment addresses all or some of the drawbacks of known phase modulators including a waveguide and a heating element configured to modify the temperature of the waveguide, in particular when the waveguide is made of silicon nitride.

Another embodiment provides a method for manufacturing a device, in particular a phase modulator, including a waveguide and a heating element configured to modify the temperature of the waveguide, in particular when the waveguide is made of silicon nitride.

One embodiment provides a manufacturing method including the following steps: a) forming a waveguide made of a first material, the waveguide is configured to guide an optical signal; b) forming a layer made of a second material that is electrically conductive and transparent to a wavelength of the optical signal, steps a) and b) being implemented such that the layer made of the second material is in contact with at least one of the faces of the waveguide, or is separated from the at least one of the faces by a distance of less than half, preferably less than a quarter, of the wavelength of the optical signal.

According to one embodiment, step a) is done before step b).

According to one embodiment: step a) includes the following successive steps:

a1) depositing a layer made of the first material on a first layer made of a third material, and a2) etching the layer made of the first material to define the waveguide therein; and in step b), the layer made of the second material is deposited on and in contact with exposed faces of the waveguide, or on and in contact with an intermediate layer with a thickness equal to the distance and previously deposited on and in contact with exposed faces of the waveguide.

According to one embodiment: before step a), the method includes a step consisting of etching a cavity in a first layer made of a third material; step a) includes the following successive steps: a1) depositing a layer made of the first material so as to fill the cavity, and a2) performing mechanical-chemical planarization up to the layer made of the third material, a portion of the layer made of the first material left in place in the cavity forming the waveguide; and in step b), the layer made of the second material is deposited on and in contact with an exposed face of the waveguide, or on and in contact with an intermediate layer with a thickness equal to the distance and previously deposited on and in contact with an exposed face of the waveguide.

According to one embodiment: before step a), the method includes a step consisting of depositing another layer made of the second material; and in step a1), the layer made of the first material is deposited on and in contact with the other layer made of the second material, or on and in contact with another intermediate layer with a thickness equal to the distance and previously deposited on and in contact with the other layer made of the second material.

According to one embodiment, the method further includes, after step b), a step consisting of depositing a second layer made of the third material and a step consisting of forming electrically conductive vias through the second layer made of the third material up to portions of the layer made of the second material.

According to one embodiment, step b) is done before step a).

According to one embodiment: in step b), the layer made of the second material is deposited on a first layer made of a third material; and step a) includes the following successive steps: a1) depositing a layer made of the first material on and in contact with the layer made of the second material, or on and in contact with an intermediate layer with a thickness equal to the distance and previously deposited on and in contact with the layer made of the second material, and a2) etching the layer made of the first material to define the waveguide therein.

According to one embodiment: before step b), the method includes a step consisting of etching a cavity in a first layer made of a third material; in step b), the layer made of the second material is deposited on the walls and the bottom of the cavity; and step a) includes the following successive steps: a1) filling the cavity by depositing a layer made of the first material on and in contact with the layer made of the second material, or on and in contact with an intermediate layer with a thickness equal to the distance and previously deposited on and in contact with the layer made of the second material; and a2) performing mechanical-chemical planarization at least up to the layer made of the second material, a portion of the layer made of the first material left in place in the cavity forming the waveguide.

According to one embodiment, the method further includes, after step a), a step consisting of depositing another layer made of the second material on and in contact with one or several exposed faces of the waveguide, or on and in contact with another intermediate layer with a thickness equal to the distance and previously deposited on and in contact with one or several exposed faces of the waveguide.

According to one embodiment, the method further includes, after step a), a step consisting of depositing a second layer made of the third material and a step consisting of forming electrically conductive vias through the second layer made of the third material up to the second material.

According to one embodiment, the first material is silicon nitride and the second material is indium tin oxide or amorphous carbon, the wavelength preferably being between 450 nm and 1 μm, for example, substantially equal to 905 nm, preferably equal to 905 nm.

Another embodiment provides a phase modulator including: a waveguide from a first material, the waveguide is configured to propagate an optical signal; and a layer made of a second electrically conductive material and that is transparent to a wavelength of the optical signal, the layer made of the second material being in contact with at least one of the faces of the waveguide, or separated from the at least one of the faces by a distance of less than half, preferably less than a quarter, of the wavelength of the optical signal.

According to one embodiment, the first material is silicon nitride and the second material is indium tin oxide or amorphous carbon, the wavelength preferably being between 450 nm and 1 μm, for example, substantially equal to 905 nm, preferably equal to 905 nm.

According to one embodiment, the modulator further includes a layer made of a thermally and electrically insulating material, preferably SiOC, with the layer of the second material being inserted between the waveguide and the layer of the thermally and electrically insulating material.

According to one embodiment, the modulator is obtained by carrying out the method described hereinabove.

According to one embodiment, the layer of the second material includes an upper portion resting on an upper face of the waveguide or a lower portion on which a lower face of the waveguide rests.

According to one embodiment, the layer of the second material further includes, for each of the side faces of the waveguide, a side portion facing the side face.

According to one embodiment, the layer of the second material includes contact portions extending laterally on either side of the waveguide and each being configured to be in contact with at least one conductive via.

Another embodiment provides a photonic integrated circuit including: a semiconductor layer of the semiconductor on insulator (SOI) type, in or on which components are defined; an interconnect structure positioned above the semiconductor layer and configured to connect the components electrically; and a modulator as described above positioned in an insulating layer of the interconnect structure, the insulating layer preferably being made of silicon oxide.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the operation of the photonic integrated circuits has not been described in detail, the described embodiments being compatible with the operation of the typical photonic integrated circuits, in particular the typical photonic integrated circuits including a phase modulator. Furthermore, the various applications in which a photonic integrated circuit can be provided, in particular a circuit including a phase modulator, have not been described, the described embodiments being compatible with the typical applications in which such a photonic integrated circuit is provided. An exemplary circuit in which a modulator as described below can be provided is an optical phased array (OPA).

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front," "back," "top," "bottom," "left," "right," etc., or to relative positional qualifiers, such as the terms "above," "below," "higher," "lower," etc., or to qualifiers of orientation, such as "horizontal," "vertical," etc., reference is made to the orientation shown in the figures.

Unless specified otherwise, the expressions "around," "approximately," "substantially" and "in the order of" signify within 10%, and preferably within 5%.

The inventors here proposed to produce a device including an optical waveguide made of a first material and a heating element in the form of one or several portions of layers made of a second material, the heating element being directly in contact with the waveguide of the device or at a small distance from the waveguide, for example, at a distance smaller than half, preferably than a quarter, of the wavelength of the optical signal that the waveguide is configured to propagate. More specifically, the heating element covers at least one face of the waveguide.

In the remainder of the description, as a non-limiting example, the case is considered of a phase modulator including a waveguide made of silicon nitride configured to guide an optical signal whose wavelength is between 450 nm and 1 µm, for example, substantially equal to 905 nm, preferably equal to 905 nm.

Figure 1:
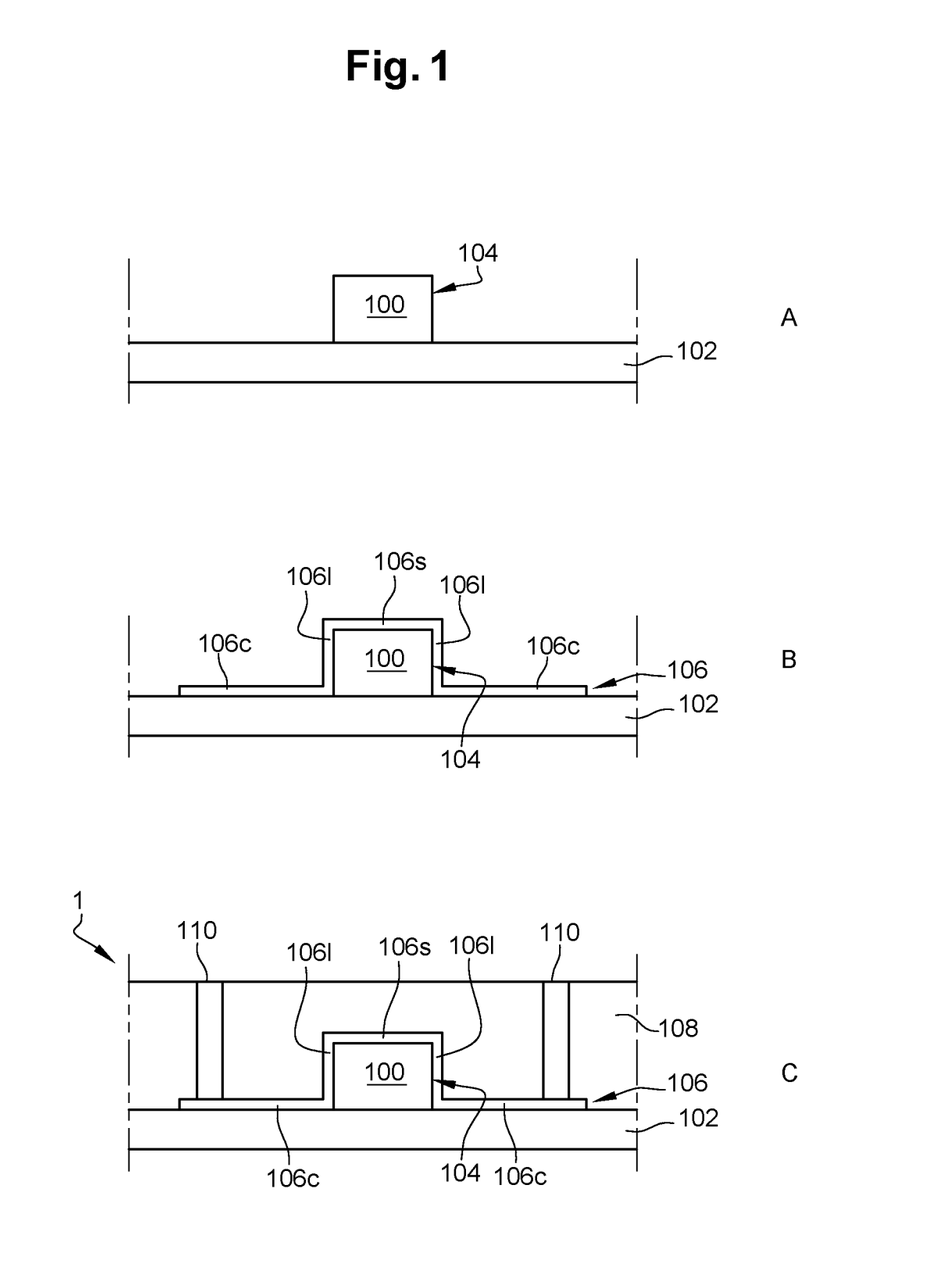
FIG. 1 shows schematic sectional views illustrating successive steps of one embodiment of a method for manufacturing a phase modulator.

FIG. 1 shows schematic sectional views A, B, and C illustrating successive steps of one embodiment of a method for manufacturing a phase modulator 1 (view C of FIG. 1). The sectional views A, B, and C are taken in a section plane orthogonal to the longitudinal direction of the modulator, that is to say, in a section plane orthogonal to the propagation direction of an optical signal in modulator 1.

In the step illustrated by view A of FIG. 1, a waveguide 100 made of the first material, for example, from silicon nitride, has been formed on a first layer 102 made of a third material, for example, silicon oxide. In this example, waveguide 100 is a strip waveguide, or in other words, is devoid of lateral fins as is the case for a rib or ridge waveguide.

In this embodiment, waveguide 100 is formed by depositing, on the entire upper surface of layer 102, a layer 104 made of the first material, then waveguide 100 is defined in layer 104 by successive steps for masking the layer portion 104 configured to form waveguide 100, and removing, by etching, non-masked portions of layer 104.

According to one embodiment, layer 104 is formed directly on layer 102. Waveguide 100 is then in contact with layer 102, and more specifically, the lower face of waveguide 100 is in contact with the upper face of layer 102.

In the step illustrated by view B of FIG. 1, layer 106 made of the second material has been deposited on and in contact with the exposed surfaces of waveguide 100. More specifically, layer 106 includes a portion 106s covering the upper face of waveguide 100, the portion 106s being in contact with the upper face of the waveguide, and two side portions 106l covering the two side faces of waveguide 100, each portion 106 is in contact with a respective side face of waveguide 100 and with the portion 106s.

In this embodiment, layer 106 further includes two portions 106c resting on layer 102, respectively on either side of waveguide 100. In section planes transverse to waveguide 100, that is to say, section planes orthogonal to the longitudinal direction of waveguide 100, each portion 106c extends laterally from a corresponding portion 106l.

Preferably, layer 106 is deposited consistently over the entire exposed surface of the structure illustrated by view A of FIG. 1 (solid plate deposition) and an etching mask is formed on the portions 106s, 106l, and 106c of layer 106 that one wishes to leave in place. The exposed (non-masked) portions of layer 106 are next removed by etching.

The material of layer 106, or the second material, is electrically conductive. Furthermore, the second material is transparent to the wavelength of the signal configured to be propagated in a guided manner in waveguide 100. In the remainder of the description, it is considered for example, than a material is transparent to a given wavelength if, at this wavelength, the imaginary part of the refraction index of the material is less than or equal to 0.01, preferably less than or equal to 0.005.

Preferably, the real part of the refraction index of the second material is less than or equal to that of the refraction index of the material of waveguide 100, which participates in the guided propagation of an optical signal in waveguide 100.

In this example where waveguide 100 is made of silicon nitride and is configured to guide a signal with a wavelength between 450 nm and 1 µm, for example, substantially equal to 905 nm, preferably equal to 905 nm, the second material is preferably indium tin oxide (ITO), or for example, amorphous carbon.

In the step illustrated by view C of FIG. 1, a second layer 108 made of the third material has been deposited so as to cover the structure illustrated by view B in FIG. 1. Thus, waveguide 100 and layer 106 are embedded in a layer of the third material including, preferably constituted by, the first layer 102 and the second layer 108 made of the third material.

Preferably, layer 108 is deposited over the entire structure illustrated by view B of FIG. 1 (solid plate deposition). Preferably, layer 108 is deposited with a thickness greater than that of the stack of waveguide 100 and the portion 106s covering the upper face of waveguide 100. Preferably, a step for planarizing the upper face of layer 108, for example, by chemical mechanical polishing (CMP), is provided after the deposition of layer 108.

Furthermore, in the step illustrated by view C of FIG. 1, the deposition of layer 108 is followed by a step for forming electrically conductive vias 110, for example, metallic vias 110. The vias 110 are formed on either side of the waveguide 100 considered in the direction of its length. In other words, in section planes transverse to waveguide 100, one via 110 is formed on one side of the first side face of waveguide 100, for example, on the right in view C, and another via 110 is formed on the side of the other side face of waveguide 100, for example, on the left in view C. The vias 110 are formed through layer 108, up to the portions 106c of layer 106. More accurately, at least one via 110 is in contact with portion 106c positioned on one side of waveguide 100, for example, on the right in view C, and at least one other via 110 is in contact with portion 106c positioned on the other side of waveguide 100, for example, on the left in view C.

During operation, when a voltage is applied between two vias 110 respectively positioned on either side of the waveguide 100, a current circulates in layer 106. This results in the heating of layer 106, therefore an increase in the temperature of waveguide 100. This causes a modification of the optical index of waveguide 100, and therefore a modulation of the optical signal propagating therein. Preferably, the voltage is applied between one or several first vias 110 positioned at the first end of waveguide 100 of the modulator taken in the direction of its length, and one or several second vias 110 positioned at a second end of waveguide 100 of the modulator taken in the direction of its length, such that the current circulates along the modulator, in a direction substantially parallel to the longitudinal direction of waveguide 100.

In this embodiment, layer 106 thus forms the heating element of modulator 1. Furthermore, in this embodiment, three faces (side faces and upper face) of waveguide 100 are covered by layer 106 and are in contact with this layer 106. In other words, in this embodiment, the heating element of modulator 1 includes an upper portion 106s in contact with the upper face of waveguide 100, two side portions 106l in contact with the respective side faces of waveguide 100, and two contact portions 106c in contact with respective vias 110 configured to receive a control voltage of the modulator.

Relative to the case of a modulator where the heating element is metallic, the heating element 106 of modulator 1 is transparent to the considered wavelengths and can therefore be positioned directly in contact with at least one face of waveguide 100 of the modulator. As a result, for the same power supplied to the heating element, modulator 1 allows greater modulation efficiency than a modulator having an identical waveguide and having the same length, measured in the propagation direction of an optical signal in the waveguide, but a metallic heating element necessarily positioned at a distance from the waveguide so as not to disrupt the signal propagating in the waveguide.

Furthermore, modulator 1 is more compact than a modulator having an identical waveguide, but a metallic heating element is necessarily positioned at a distance from the waveguide so as not to disrupt the signal propagating in the waveguide. In particular, for a given modulation efficiency, and for a given power supplied to the heating element, modulator 1 is not as long as a modulator having an identical waveguide, but a heating element positioned at a distance from the waveguide.

In an embodiment variant that is not illustrated, in the step of view B, a layer of a fourth thermally and electrically insulating material, for example, SiOC, is deposited on layer 106. This makes it possible to limit, or even eliminate, a temperature increase in a waveguide positioned in the vicinity of modulator 1, during heating of layer 106.

Figure 2:
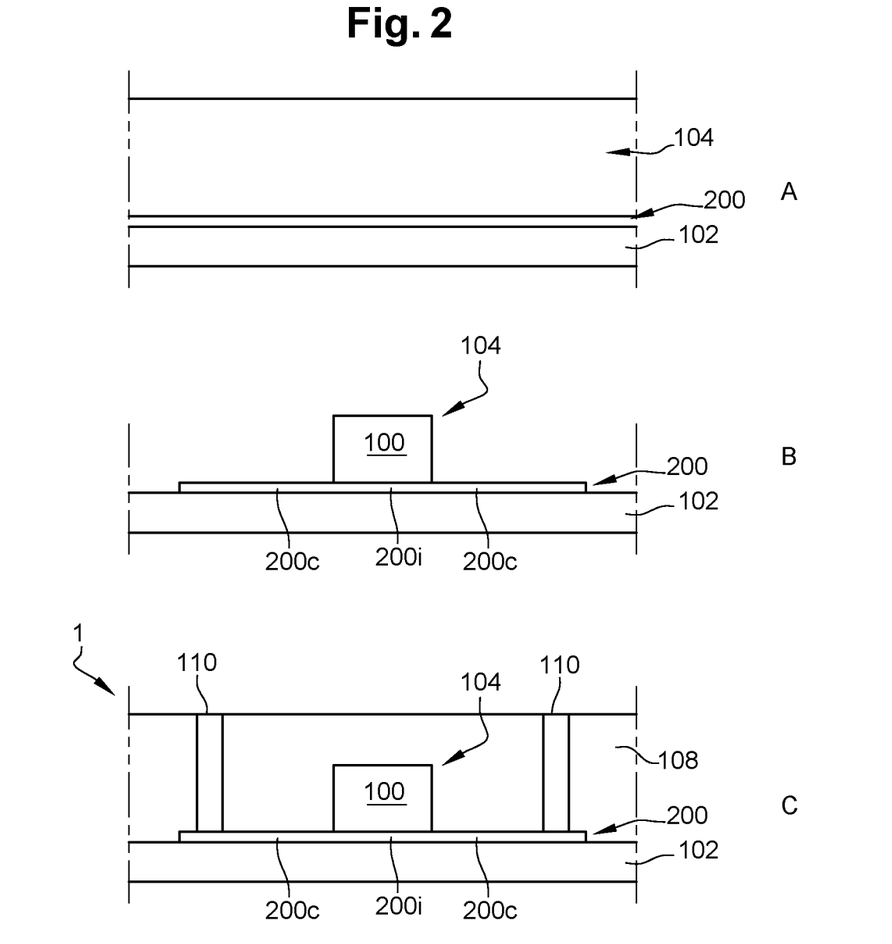
FIG. 2 shows schematic sectional views illustrating successive steps of another embodiment of a method for manufacturing a phase modulator.

FIG. 2 shows schematic sectional views A, B, and C illustrating successive steps of another embodiment of the method of FIG. 1. The sectional views A, B, and C are taken in a section plane orthogonal to the longitudinal direction of modulator 1 (view C of FIG. 2).

In this embodiment, rather than depositing a layer 106 made of the second material after defining waveguide 100 in layer 104, a layer 200 made of the second material is deposited before the deposition of layer 104, layer 104 then being formed on and in contact with this layer 200.

In the step of view A of FIG. 2, layer 200 has been formed on layer 102, then layer 104 has been formed on and in contact with layer 200. As an example, layers 200 and 104 are formed by deposition, preferably by solid plate deposition.

According to one embodiment, layer 200 is formed directly on layer 102, layer 200 then being in contact with layer 102.

In the step illustrated by view B of FIG. 2, waveguide 100 has been defined in layer 104, for example, by successive masking and etching steps of layer 104 that are similar to those described in relation to view A of FIG. 1. The etching of layer 104 here is stopped on layer 200.

Furthermore, in the step illustrated by view B of FIG. 2, portions of layer 200 have been removed by etching. During this etching, a portion 200i of layer 200 is left in place below the lower face of waveguide 100, and two portions 200c of layer 200 are left in place on either side of waveguide 100. In section planes transverse to waveguide 100, each portion 200c extends laterally on a different side of waveguide 100, from portion 200i. As an example, the etching mask used for this step covers waveguide 100 and overflows laterally, on layer 200, on either side of waveguide 100.

The view C of FIG. 2 illustrates the obtained structure after the implementation of the steps described in relation to view C of FIG. 1, from the structure illustrated by view B of FIG. 2, the conductive vias 110 here being formed up to the portions 200c rather than up to the portions 106c as had been described in relation with FIG. 1.

In this embodiment, the heating element includes a lower portion 200i in contact with the lower face of waveguide 100, and two contact portions 200c in contact with the vias 110. In this embodiment, a single face (lower face) of waveguide 100 is covered by the heating element.

The operation of the modulator in FIG. 2 is similar to that of FIG. 1. Furthermore, relative to a modulator including a metallic heating element, modulator 1 of view C of FIG. 2 benefits from the same advantages as modulator 1 of view C of FIG. 1.

In an embodiment variant that is not illustrated, a layer made of the fourth material is deposited on layer 102 prior to the deposition of layer 200, layer 200 is deposited on and in contact with this layer made of the fourth material, or a layer of the fourth material is deposited, before the steps of view C, on the portions 200c and on waveguide 100. Like before, this makes it possible to limit, or even eliminate, a temperature increase in a waveguide positioned in the vicinity of the modulator 1 when a current circulates in the heating element of the modulator.

Figure 3:
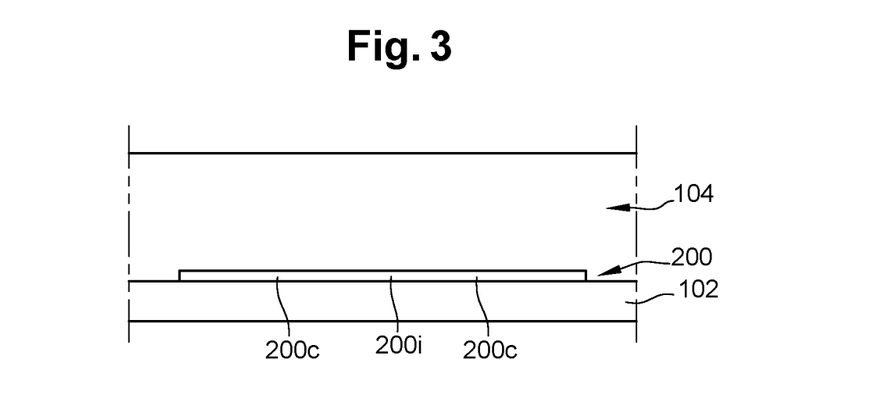
FIG. 3 shows a schematic sectional view illustrating a step of an embodiment variant of the method of FIG. 3.

FIG. 3 shows a schematic sectional view illustrating a step of an embodiment variant of the method of FIG. 2, and more particularly of the step described in relation with view A of FIG. 2. The sectional view of FIG. 3 is taken in a section plane orthogonal to the longitudinal direction of the modulator.

In this variant, layer 200 is etched prior to the deposition of layer 104, so as only to leave the portions 200i and 200c of layer 200 in place.

The other steps of this variant are similar or identical to those described in relation to FIG. 2 and lead to obtaining modulator 1 as illustrated by view C of FIG. 2.

Figure 4:
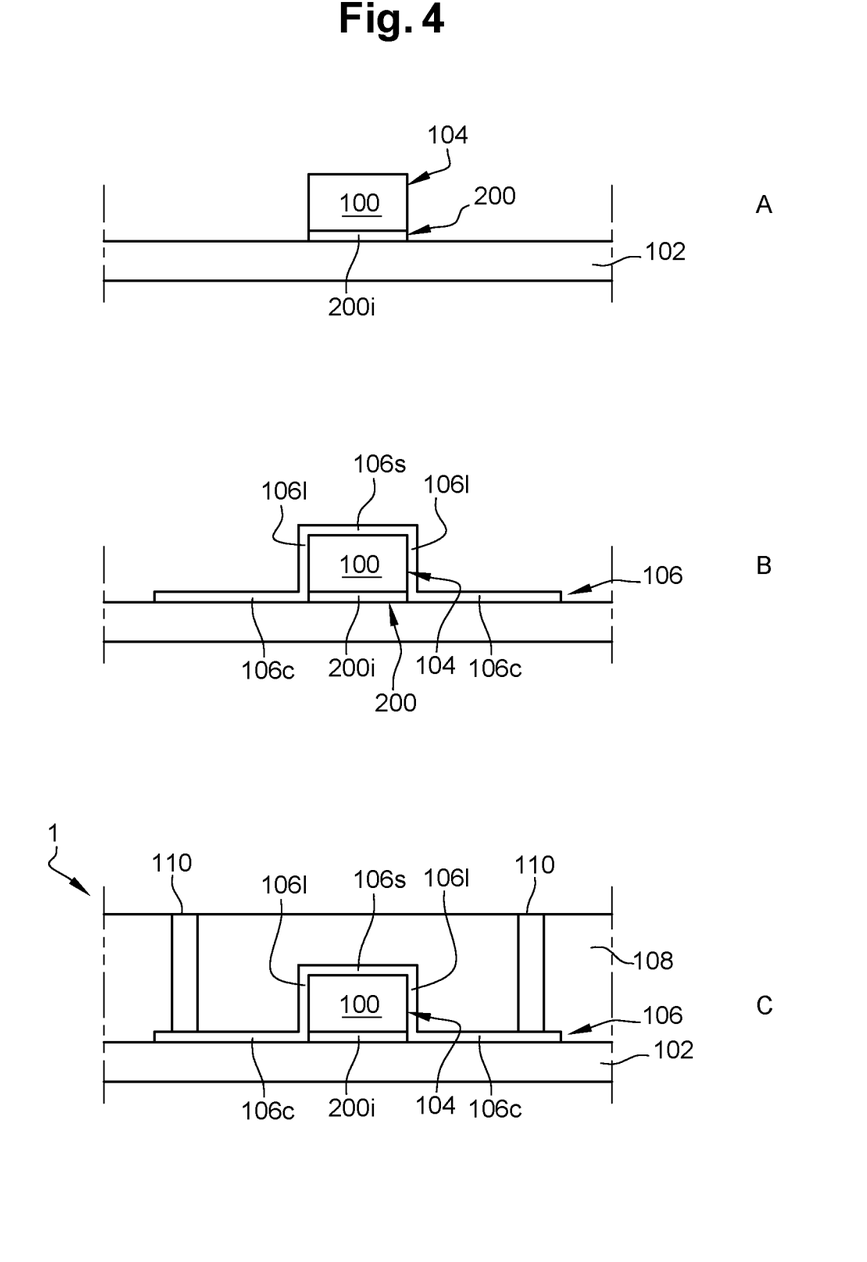
FIG. 4 shows schematic sectional views illustrating successive steps of another embodiment of a method for manufacturing a phase modulator.

FIG. 4 shows schematic sectional views A, B, and C illustrating successive steps of another embodiment of a method for manufacturing a modulator 1 (view C of FIG. 4). The section views A, B, and C are taken in a section plane orthogonal to the longitudinal direction of the modulator 1.

This embodiment corresponds to a combination of the embodiment described in relation to FIG. 1, and the embodiment described in relation to FIGS. 2 and 3. In other words, in this embodiment, it is provided to deposit layer 200 before forming waveguide 100, then to deposit layer 106 after forming waveguide 100.

In the step illustrated by view A of FIG. 4, the steps described in relation to views A and B of FIG. 2 have been implemented, with the difference that only portion 200i of layer 200 has been left in place. As an example, the same etching mask is used to define waveguide 100 in layer 104 and to etch layer 106.

The view B of FIG. 4 illustrates the obtained structure after the implementation of the steps described in relation to view B of FIG. 1, from the structure illustrated by view A of FIG. 4.

The view C of FIG. 4 illustrates the obtained structure after the implementation of the steps described in relation to view C of FIG. 1, from the structure illustrated by view B of FIG. 4.

In this embodiment, the heating element of modulator 1 includes a lower portion 200i in contact with the lower face of waveguide 100, an upper portion 106s in contact with the upper face of waveguide 100, two side portions 106l in contact with the respective side faces of waveguide 100, and two contact portions 106c in contact with the vias 110. The portions 106s and 200i are electrically linked in parallel by portions 106l.

The operation of modulator 1 of FIG. 4 is similar to that of FIG. 1 or FIG. 2. However, waveguide 100 of modulator 1 of FIG. 4 includes more faces in contact with the heating element than modulator 1 of FIG. 1 or FIG. 2. Thus, modulator 1 of FIG. 4 allows, for the same voltage applied between the vias 110, a greater modulation efficiency than modulator 1 of FIG. 1 or of FIG. 2. Furthermore, modulator 1 of FIG. 4 allows an increase of the temperature in waveguide 100, which is more homogeneous than in waveguide 100 of modulator 1 of FIG. 1 or 2.

Moreover, relative to a modulator including a metallic heating element, modulator 1 of FIG. 4 benefits from the same advantages as modulator 1 of FIG. 1 or FIG. 2.

In an embodiment variant that is not illustrated, the thickness of layers 200 and 106 is configured to balance the resistance of a conductive path, including the portions 106l and 106s of layer 106 in contact with waveguide 100, with that of a conductive path, including the portion 200i of layer 200 in contact with waveguide 100. This makes it possible to heat waveguide 100 more homogeneously.

In another embodiment variant that is not illustrated, a layer made of the fourth material is deposited on layer 102 before the deposition of layer 200, preferably on and in contact with layer 200, or a layer made of the fourth material is deposited on layer 106, preferably in contact with layer 106. Like before, this makes it possible to limit, or even eliminate, a temperature increase in a waveguide positioned in the vicinity of the modulator 1 when a current circulates in the heating element of the modulator.

Embodiments and variants have been described, in relation to FIGS. 1 to 4, in which waveguide 100 is defined, for example, by masking and etching steps, in a layer 104 made of the material of waveguide 100. In these embodiments and variants, layer 200 is deposited before the formation of waveguide 100 or layer 106 is deposited after the formation of waveguide 100 to form, from layers 106 or 200, a heating element, or heating layer, in contact with at least one longitudinal face of the waveguide.

Other embodiments and variants will now be described, in which waveguide 100 is formed by successive steps for etching a cavity, depositing a layer made of the material of the waveguide to fill the cavity, and CMP up to the top of the cavity. Like before, layer 200 is deposited before the formation of waveguide 100 or layer 106 is deposited after the formation of waveguide 100 so as to form, from layers 106 or 200, a heating element, or heating layer, in contact with at least one longitudinal face (side, upper or lower) of waveguide 100.

Figure 5:
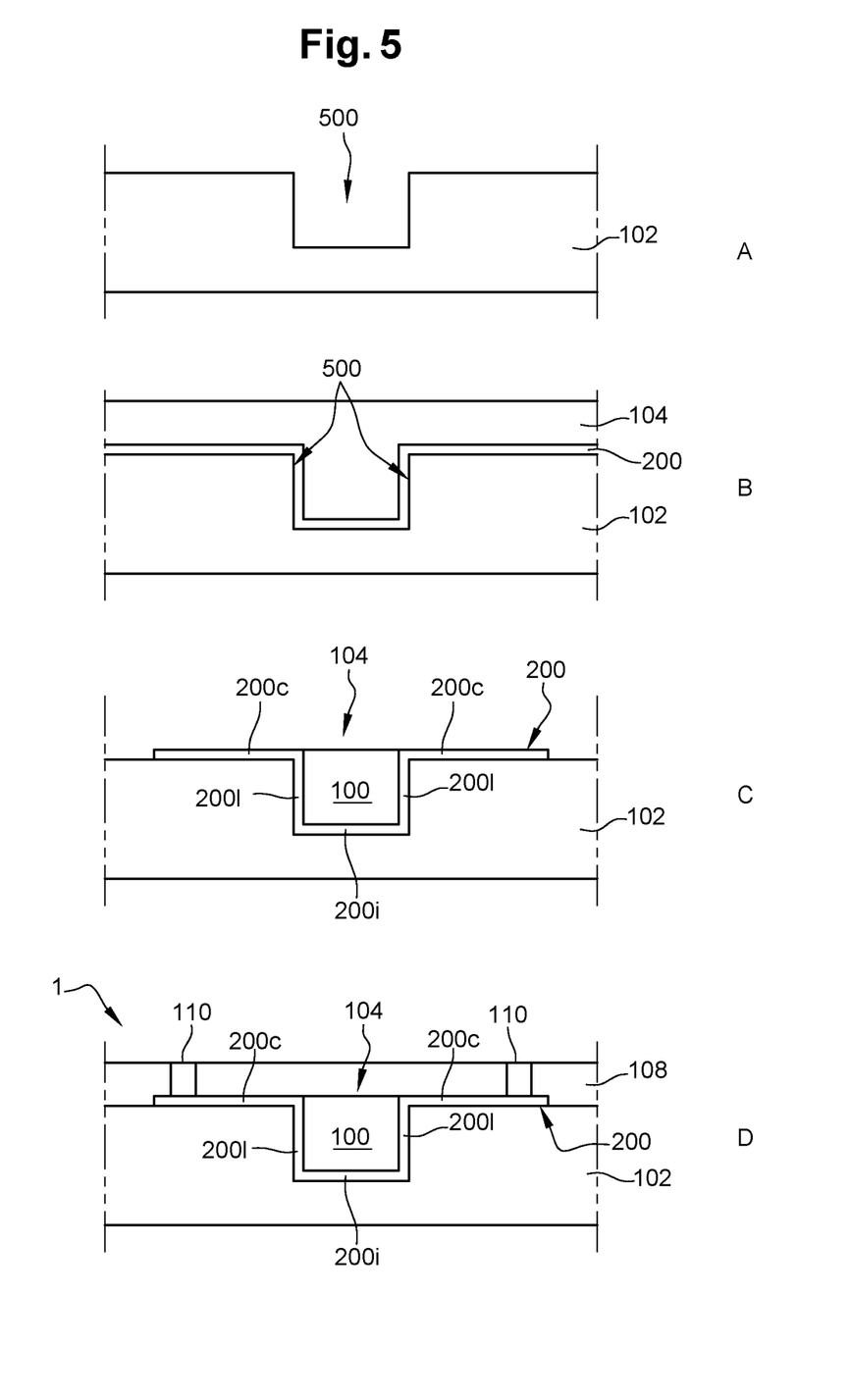
FIG. 5 shows schematic sectional views illustrating successive steps of another embodiment of a method for manufacturing a phase modulator.

FIG. 5 shows schematic section views A, B, C, and D illustrating successive steps of another embodiment of a method for manufacturing the phase modulator 1 (view D of FIG. 5). The section views A, B, C, and D are taken in a section plane orthogonal to the longitudinal direction of modulator 1.

In the step illustrated by view A of FIG. 5, a cavity 500 has been etched in layer 102. The dimensions of the cavity are determined by those of waveguide 100 (absent in view A of FIG. 5) that will be formed therein. Preferably, the dimensions of cavity 500 are substantially equal to those of waveguide 100.

Preferably, cavity 500 is etched from the upper face of layer 102, over only part of the thickness of layer 102, such that part of the thickness of layer 102 remains below the bottom of cavity 500.

In the step illustrated by view B of FIG. 5, layer 200 made of the second material has been deposited, preferably over the entire exposed surface of layer 102 (solid plate deposition), preferably consistently, so as to cover the bottom and the walls of cavity 500. Layer 104 has next been deposited so as to fill cavity 500. Layer 104 is deposited on and in contact with layer 200.

In the step illustrated by view C of FIG. 5, the portions of layer 104 positioned above the upper level of cavity 500, that is to say, here, the upper level of layer 200, have been removed by CMP up to layer 200. The portion of layer 104 left in place in cavity 500 then forms waveguide 100 of the modulator. The lower face and the side faces of waveguide 100 are then covered by the portions of layer 200 left in place in cavity 500. More particularly, the lower face of waveguide 100 is in contact with a portion 200i of layer 200, the side faces of waveguide 100 being in contact with respective portions 200l of layer 200. The portions 200l are in contact with portion 200i.

Furthermore, in the step illustrated by view C of FIG. 5, portions of layer 200 resting on layer 102, that is to say, portions of layer 200 positioned outside cavity 500, have been removed by etching, leaving in place, on layer 102, portions 200c of layer 200 positioned, in planes transverse to waveguide 100, respectively on either side of waveguide 100. Each portion 200c left in place is in contact with a corresponding portion 200l or, in other words, each portion 200c extends laterally from a corresponding portion 200l.

As an example, this step for definition by etching of portions 200c in layer 200 is done using an etching mask covering the upper face of waveguide 100 and laterally overflowing on layer 200, and more specifically on portions 200c of layer 200.

View D of FIG. 5 illustrates the structure obtained after the implementation of the steps described in relation to the view C of FIG. 1, from the structure illustrated by view C of FIG. 5, with the difference that the vias 110 are formed up to the portions 200c rather than up to portions 106c.

In this embodiment, the heating element of modulator 1 includes a lower portion 200i in contact with the lower face of waveguide 100, two side portions 200l in contact with the respective side faces of waveguide 100, and two contact portions 200c in contact with the vias 110. A first portion 200c, a first portion 200l, a portion 200i, a second portion 200l, and a second portion 200c are linked in series between the vias 110.

The operation of the modulator in FIG. 5 is similar to that of FIG. 1. Furthermore, relative to a modulator including a metallic heating element, modulator 1 of FIG. 5 benefits from the same advantages as modulator 1 of FIG. 1.

In an embodiment variant that is not illustrated, a layer made of the fourth material is deposited on layer 102 prior to the deposition of layer 200, layer 200 is deposited on and in contact with this layer made of the fourth material, or a layer of the fourth material is deposited, between the steps of view C and those of view D, on the portions 200c and on waveguide 100. Like before, this makes it possible to limit, or even eliminate, a temperature increase in a waveguide positioned in the vicinity of the modulator 1 when a current circulates in the heating element of the modulator.

Figure 6:
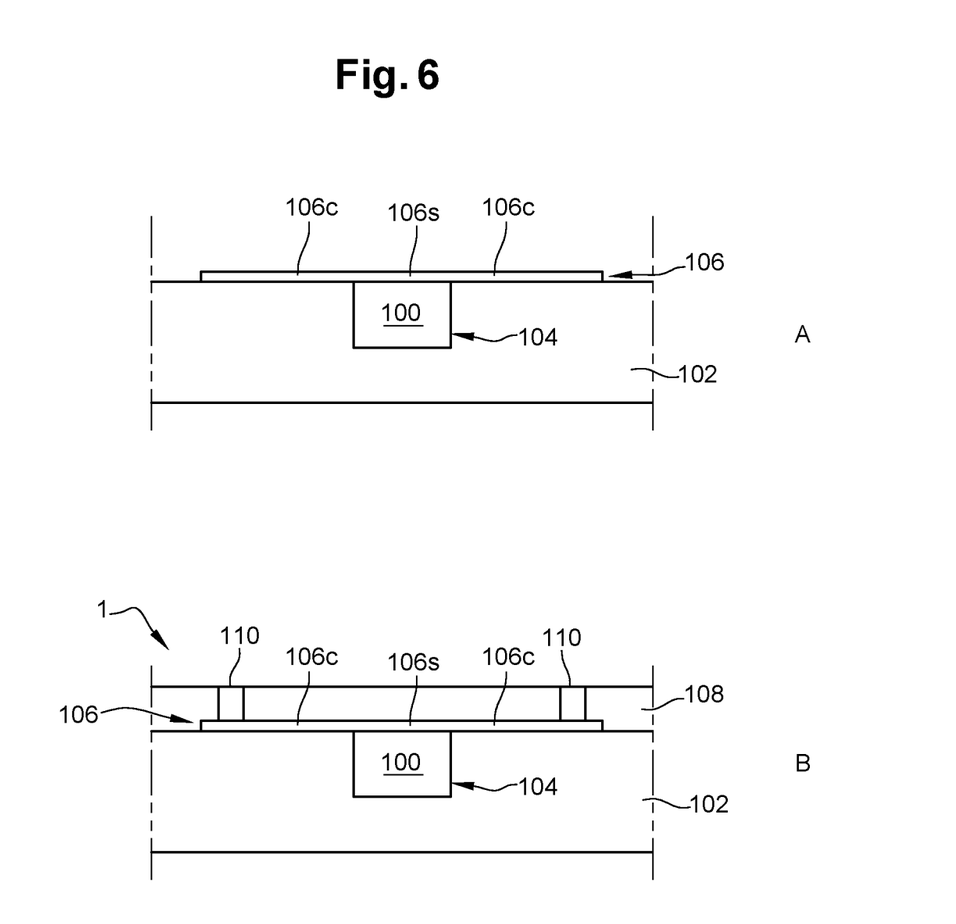
FIG. 6 shows schematic sectional views illustrating successive steps of another embodiment of a method for manufacturing a phase modulator.

FIG. 6 shows schematic section views A and B illustrating successive steps of another embodiment of a method for manufacturing the modulator 1 (view B of FIG. 6). The section views A and B are taken in a section plane orthogonal to the longitudinal direction of modulator 1.

In this embodiment, rather than depositing layer 200 before the formation of waveguide 100 in cavity 500, layer 106 made of the third material is deposited after the formation of waveguide 100 in cavity 500.

In the step illustrated by view A of FIG. 6, cavity 500 (not referenced in FIG. 6) has been etched in layer 102 similarly to what was described in relation to view A of FIG. 5, then layer 104 has been deposited to fill cavity 500 similarly to what was described in relation with view B of FIG. 5. The portions of layer 104 positioned above the upper level of cavity 500, that is to say, here, the upper level of layer 102, have next been removed by CMP up to layer 102. The portion of layer 104 left in place in cavity 500 then forms waveguide 100.

Furthermore, in the step illustrated by view A of FIG. 6, layer 106 has been deposited on the exposed face of the structure, that is to say, here, the upper face of waveguide 100 and the exposed face of layer 102.

Portions of layer 106 have next been removed by etching. The etching is done so as to leave in place a portion 106s of layer 106 covering the upper face of waveguide 100 and, on either side of the waveguide 100, portions 106c of layer 106. The portion 106s is in contact with the upper face of the waveguide. Each portion 106c extends laterally from the portion 106s.

The view B of FIG. 6 illustrates the obtained structure after the implementation of the steps described in relation to view C of FIG. 1, from the structure illustrated by view B of FIG. 6.

In this embodiment, the heating element of modulator 1 includes contact portions 106c and an upper portion 106s. The first portion 160c, the portion 106s, and the second portion 106c are linked in series between the vias 110.

The operation of the modulator in FIG. 6 is similar to that of FIG. 1. Furthermore, relative to a modulator including a metallic heating element, modulator 1 of FIG. 6 benefits from the same advantages as modulator 1 of FIG. 1.

In an embodiment variant that is not illustrated, a layer made of the fourth material is deposited on layer 106 prior to the deposition of layer 108, or a layer made of the fourth material is deposited (solid plate) on layer 102 between the etching of cavity 500 and the deposition of layer 104. In this last case, after the deposition of layer 104, the CMP step can be stopped on the layer of the fourth material deposited on layer 102, or on layer 102. Like before, the deposition of one or two layers of the fourth material makes it possible to limit, or even eliminate, a temperature increase in a waveguide positioned in the vicinity of the modulator 1 when a current circulates in the heating element of the modulator.

Figure 7:
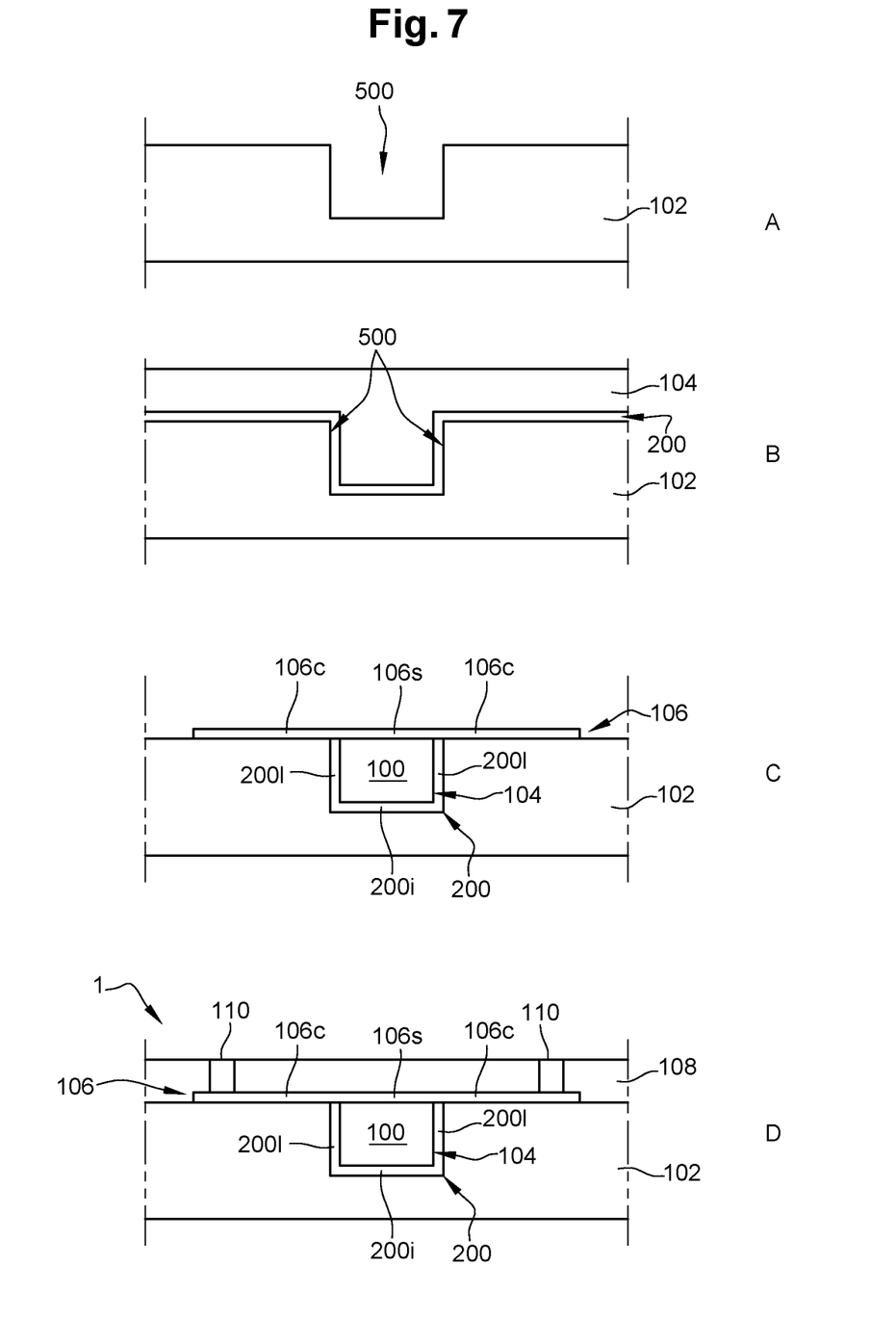
FIG. 7 shows schematic sectional views illustrating successive steps of another embodiment of a method for manufacturing a phase modulator.

FIG. 7 shows schematic section views A, B, C, and D illustrating successive steps of another embodiment of a method for manufacturing a modulator 1 (view D of FIG. 7). The section views A, B, C, and D are taken in a section plane orthogonal to the longitudinal direction of modulator 1.

This embodiment corresponds to a combination of the embodiment described in relation to FIG. 5, and the embodiment described in relation to FIG. 6. In other words, in this embodiment, it is provided to deposit layer 200 before forming waveguide 100, then to deposit layer 106 after forming waveguide 100.

Views A and B of FIG. 7 are identical to respective views A and B of FIG. 5 and illustrate the same steps as those described in relation to respective views A and B of FIG. 5.

In the step illustrated by view C of FIG. 7, the portions of layers 200 and 104 positioned above the upper level of cavity 500, that is to say, here, above the upper level of layer 102, have been removed by CMP up to layer 102. The portion of layer 104 left in place in cavity 500 then forms waveguide 100 of the modulator. The lower face and the side faces of waveguide 100 are then covered by the portions of layer 200 left in place in cavity 500. More particularly, the lower face of waveguide 100 is in contact with a portion 200i of layer 200, the side faces of waveguide 100 being in contact with respective portions 200l of layer 200. Portions 200l are in contact with portion 200i.

It will be noted that relative to the embodiment described in relation to FIG. 5, the portions 200c of layer 200 are removed during the CMP step.

Still, in the step illustrated by view C of FIG. 7, layer 106 has next been formed over the entire exposed surface of the structure, that is to say, here, the upper face of waveguide 100 and the exposed face of layer 102.

Portions of layer 106 have next been removed by etching. The etching is done so as to leave in place a portion 106s of layer 106 covering the upper face of waveguide 100 and, on either side of the waveguide 100, portions 106c of layer 106. The portion 106s is in contact with the upper face of the waveguide. Each portion 106c extends laterally from the portion 106s. Furthermore, the apex of each portion 200l of layer 200 is in contact with a corresponding portion 106c.

View D of FIG. 7 illustrates the obtained structure after the implementation of the steps described in relation to view C of FIG. 1, from the structure illustrated by view C of FIG. 7.

In this embodiment, the heating element of modulator 1 includes two side portions 200l covering the respective side faces of waveguide 100, a lower portion 200i covering the lower face of waveguide 100, an upper portion 106s covering the upper face of waveguide 100, and two contact portions 106c in contact with the vias 110. Portion 200i electrically links the portions 200l to one another, the portions 200l and 200i being connected in series. Furthermore, between portions 106c, the set of portions 200i and 200l is connected in parallel with the portion 106s, the portions 106c each being connected to a different via 110.

The operation of the modulator in FIG. 7 is similar to that of FIG. 1. Furthermore, relative to a modulator including a metallic heating element, modulator 1 of FIG. 7 benefits from the same advantages as modulator 1 of FIG. 1.

In an embodiment variant that is not illustrated, a layer made of the fourth material is deposited on layer 102, and in particular in cavity 500, prior to the deposition of layer 200 or a layer made of the fourth material is deposited on layer 106, prior to the deposition of layer 108. Like before, this makes it possible to limit, or even eliminate, a temperature increase in a waveguide positioned in the vicinity of the modulator 1 when a current circulates in the heating element of the modulator.

Figure 8:
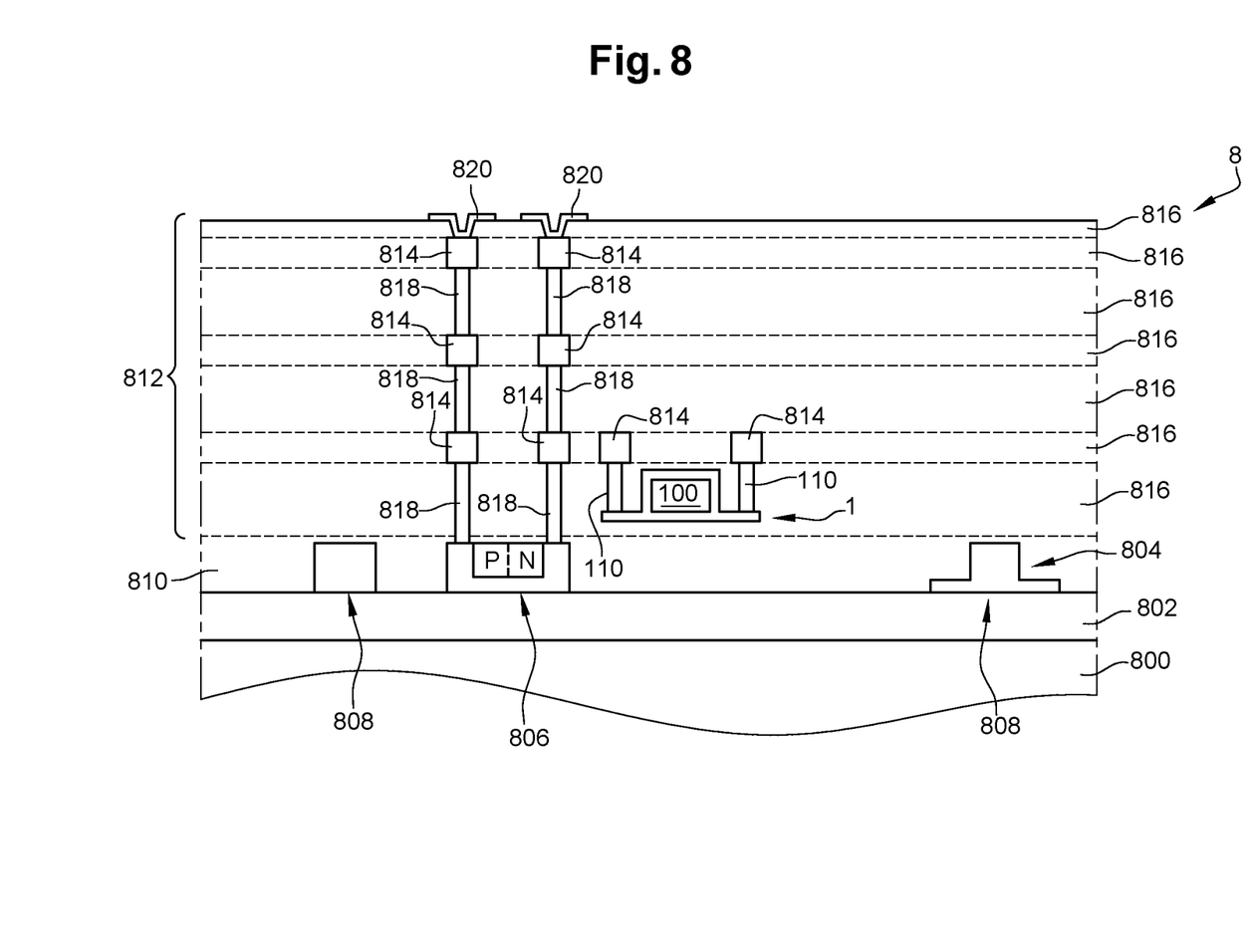
FIG. 8 shows a schematic sectional view of an embodiment of a photonic integrated circuit including a phase modulator.

FIG. 8 shows a section view illustrating an embodiment of a photonic integrated circuit 8 including a modulator 1 as previously described. More specifically, in this example, modulator 1 is of the type of that illustrated by view C of FIG. 4.

Circuit 8 includes a substrate 800 covered by an insulating layer 802, in turn, covered by a semiconductor layer 804, for example, monocrystalline silicon. Layer 804 and layer 802 form a structure of the semiconductor-on-insulator (SOI) type.

Various components 806 have been formed from layer 804, for example, by conventional masking, etching, epitaxy, or doping steps. In other words, the components are formed or positioned in or on layer 804. In the illustrated example, the circuit includes a photodiode 806, for example, a photodiode made of germanium epitaxied from layer 804, or a silicon photodiode formed in a silicon layer 804.

Waveguides 808 have also been defined in layer 804, for example, by conventional masking and etching steps of layer 804.

In the illustrated example, circuit 8 includes, from left to right in FIG. 8, a strip waveguide 808, the photodiode 806, and a rib or ridge waveguide 808.

The components 806 and the waveguides 808 are covered by an insulating layer 810, for example, of silicon oxide.

Circuit 8 further includes an interconnect structure 812 resting on layer 810. The interconnect structure 812 includes portions of metallic layers 814 separated from one another by insulating layers 816. The interconnect structure 812 further includes electrically conductive vias 818 passing through layers 816 in order to connect portions of metallic layers 814 to one another, to contact pads 820 positioned at the upper face of the interconnect structure 812 or to components 806.

According to one embodiment, modulator 1 is positioned in an insulating layer 816 of the interconnect structure 812, preferably a layer 816 positioned between layer 810 and the lower metal level of the interconnect structure 812. As an example, the lower metal level includes the metallic layer portions 814 positioned at the same level and which are closest to layer 804.

Layer 816 in which modulator 1 is positioned includes, preferably is made up of, the layers 102 and 108 previously described (not shown in FIG. 8).

The interconnect structure 812 includes the vias 110 of the modulator 1. The vias 110 are electrically linked to metallic layer portions 814 of the interconnect structure 812, for example, portions 814 of the lower metal level.

As an example, circuit 8 is obtained by carrying out the following steps:
  forming components 806 or waveguides 808 from a layer 804 of the SOI type; and
  forming an interconnect structure 812 above layer 804, forming the interconnect structure 812 including the step consisting of forming a layer 102 (not shown in FIG. 8) and carrying out one of the methods described hereinabove in relation to FIGS. 1 to 7 such that the layers 102 and 108 (not shown in FIG. 8) correspond to an insulating layer 816 of the interconnect structure 812, that is to say, form an insulating layer 816 of this interconnect structure.

According to one embodiment, circuit 8 is configured to carry out a light detection and ranging (LIDAR) function.

Described hereinabove, in relation to FIGS. 1 to 8, are embodiments and variants in which the modulator 1 includes a waveguide 100 made of silicon nitride embedded in insulating layers 102 and 108, for example, made of silicon oxide, and a heating element, for example, made of ITO, in contact with at least one face of the waveguide. These embodiments and variants can be adapted to the case of a modulator 1 including a waveguide made of another material, by modifying the material of the heating element, as long as the material of the heating element remains electrically conductive and transparent to the wavelengths of a signal configured to be propagated in the waveguide.

As an example, waveguide 100 can be made of monocrystalline silicon in a layer of the SOI type, preferably by carrying out the method described in relation to FIG. 1, layer 102 for example, corresponding to a layer of silicon oxide on which the SOI-type layer rests or the material of layer 106 for example, being ZnO, $Cd_2SnO_4$, or amorphous carbon.

Furthermore, although examples of embodiments and variants have been described in which waveguide 100 is a strip waveguide, one skilled in the art is able to adapt these embodiments and variants to the case of a rib or ridge waveguide 100.

Moreover, embodiments and variants have been described in which the heating element is in direct contact with one or several faces of the waveguide. These embodiments and variants can be adapted to the case where the heating element is not in direct contact with these faces of the waveguide but remain positioned at a distance from the waveguide smaller than half, preferably than a quarter, of the wavelength of the signal that the waveguide propagates.

For example, it is possible to provide that the heating element is separated from one or several faces of the waveguide by an intermediate layer with a thickness smaller than half, preferably than a quarter, of the wavelength of the optical signal that the waveguide propagates. In other words, the intermediate layer includes a first face in contact with the waveguide and a second face, opposite the first, in contact with the heating element, the thickness of the intermediate layer being measured between its first and second faces. Providing such an intermediate layer can make it possible for the heating element to disrupt the optical signal propagated in the waveguide less relative to the case where the heating element is in contact with the waveguide. The intermediate layer is preferably made up of a single layer. The intermediate layer is preferably made of a material with an optical index lower than that of the first material, for example, from the third material.

One skilled in the art is able to adapt the described embodiments and variants to the case where such an intermediate layer is provided, in particular, to provide the step for depositing this intermediate layer. In particular, an intermediate layer can be deposited on and in contact with the waveguide before depositing a layer of the second material on and in contact with the intermediate layer, or an intermediate layer can be deposited on and in contact with a layer made of the second material, before forming the waveguide on and in contact with the intermediate layer.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove. In particular, one skilled in the art is able to determine the length of each portion 106c and 200c, for example, measured from side faces of waveguide 100, for example, in a direction orthogonal to these faces, and the distance between the side faces of waveguide 100 and the conductive vias 110, for example, measured in a direction orthogonal to these faces, so that the metallic vias 110 do not disrupt the propagation of an optical signal in waveguide 100. More generally, one skilled in the art is able to determine the various dimensions of the modulator 1, for example, the dimensions of the cross-section of waveguide 100 as a function of the signal to be guided or the thickness of the layers 106 and 200, from the functional description given above. To that end, one skilled in the art can use computer-assisted simulation software such as the software designated by the commercial name Lumerical.

What is claimed is:
1. A manufacturing method, comprising:
  forming a waveguide from a first material, the waveguide used to guide an optical signal, the waveguide having a first side adjacent to an insulating layer, a second side and a third side perpendicular to the first side, and a fourth side parallel to the first side; and
  forming a layer made of a second material, the second material being electrically conductive and transparent to a wavelength of the optical signal, the layer being disposed over the first side, the second side, the third side, and the fourth side of the waveguide, the layer being in direct contact with the first side, the second side, the third side, the fourth side, or a combination thereof.

2. The manufacturing method of claim 1, wherein forming the waveguide comprises:
depositing a first layer made of the first material on a second layer made of a third material; and
etching the first layer to define the waveguide therein, wherein the first layer is deposited on and in contact with exposed faces of the waveguide.

3. The manufacturing method of claim 2, further comprising:
depositing the second layer; and
forming electrically conductive vias through the second layer up to portions of the first layer.

4. The manufacturing method of claim 1, wherein the insulating layer comprises silicon oxide.

5. The manufacturing method of claim 1, wherein the layer is a first layer, the method further comprising forming a second layer of a thermally and electrically insulating material, wherein the first layer is disposed between the waveguide and the second layer.

6. The manufacturing method of claim 1, wherein the layer is a first layer, the method further comprising:
etching a cavity in a second layer made of a third material;
depositing a third layer made of the first material to fill the cavity; and
performing mechanical-chemical planarization up to the second layer and a portion of the third layer left in place in the cavity forming the waveguide, wherein the first layer is deposited on and in contact with an exposed face of the waveguide.

7. The manufacturing method of claim 1, wherein the first material is silicon nitride and the second material is indium tin oxide or amorphous carbon.

8. A manufacturing method, comprising:
forming a waveguide from a first material, the waveguide used to guide an optical signal, the waveguide having a first side adjacent to an insulating layer, a second side and a third side perpendicular to the first side, and a fourth side parallel to the first side; and
forming a layer made of a second material, the second material being electrically conductive and transparent to a wavelength of the optical signal, the layer being disposed over the first side, the second side, the third side, and the fourth side of the waveguide, the layer being separated from the first side, the second side, the third side, the fourth side, or a combination thereof by a distance of less than half of the wavelength of the optical signal.

9. The manufacturing method of claim 8, wherein forming the waveguide comprises:
depositing a first layer made of the first material on a second layer made of a third material; and
etching the first layer to define the waveguide therein, wherein the first layer is deposited on and in contact with an intermediate layer with a thickness equal to the distance, wherein the intermediate layer is previously deposited on and in contact with the exposed faces of the waveguide.

10. The manufacturing method of claim 9, further comprising:
depositing the second layer; and
forming electrically conductive vias through the second layer up to portions of the first layer.

11. The manufacturing method of claim 8, wherein the layer is a first layer, the method further comprising:
etching a cavity in a second layer made of a third material;
depositing a third layer made of the first material to fill the cavity; and
performing mechanical-chemical planarization up to the second layer and a portion of the third layer left in place in the cavity forming the waveguide, wherein the first layer is deposited on and in contact with an intermediate layer with a thickness equal to the distance, wherein the intermediate layer is previously deposited on and in contact with the exposed face of the waveguide.

12. The manufacturing method of claim 8, wherein the insulating layer comprises silicon oxide.

13. The manufacturing method of claim 8, wherein the layer is a first layer, the method further comprising forming a second layer of a thermally and electrically insulating material, wherein the first layer is disposed between the waveguide and the second layer.

14. The manufacturing method of claim 8, wherein the first material is silicon nitride, the second material is indium tin oxide or amorphous carbon, and the wavelength is between 450 nm and 1 µm.

15. The manufacturing method of claim 8, wherein the layer is separated from the first side, the second side, the third side, or the fourth side by a distance of less than a quarter of the wavelength of the optical signal.

16. A method of operating a modulator comprising a waveguide, the method comprising:
applying a voltage between electronically conductive vias positioned on a first side and a second side of a waveguide, the applying the voltage causing a current to circulate in a first layer coupled to the waveguide resulting in an increase in a temperature of the waveguide and a modification of an optical index of the waveguide, the waveguide being formed from a first material, the waveguide used to guide an optical signal, the waveguide having a third side adjacent to an insulating layer and a fourth side parallel to the third side, the first side and the second side being perpendicular to the third side, a second layer being disposed over the first side, the second side, the third side, and the fourth side of the waveguide, the second layer being formed from a second material and electrically conductive and transparent to a wavelength of the optical signal, and
wherein the second layer is separated from the first side, the second side, the third side, the fourth side, or a combination thereof by a distance of less than half of the wavelength of the optical signal, or
wherein the second layer is in direct contact with the first side, the second side, the third side, the fourth side, or a combination thereof.

17. The method of claim 16, wherein the modification of the optical index causes a modulation of the optical index of the waveguide.

18. The method of claim 16, wherein the electronically conductive vias are positioned such that the current circulates along the modulator in a direction parallel to the third side.

19. The method of claim 16, wherein the insulating layer comprises silicon oxide.

20. The method of claim 16, wherein the second layer is disposed between the first layer and the waveguide.

* * * * *